US012732682B2

(12) United States Patent
Tanaka

(10) Patent No.: US 12,732,682 B2
(45) Date of Patent: Sep. 8, 2026

(54) OPTICAL APPARATUS, VEHICLE-MOUNTED CAMERA, AND TRANSPORTATION APPARATUS

(71) Applicant: CANON KABUSHIKI KAISHA, Tokyo (JP)

(72) Inventor: Tatsuya Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 18/824,545

(22) Filed: Sep. 4, 2024

(65) Prior Publication Data

US 2025/0088724 A1 Mar. 13, 2025

(30) Foreign Application Priority Data

Sep. 8, 2023 (JP) ................................ 2023-145935
Aug. 5, 2024 (JP) ................................ 2024-128717

(51) Int. Cl.
*H04N 23/55* (2023.01)
*G02B 7/02* (2021.01)
*G03B 30/00* (2021.01)
*H04N 23/51* (2023.01)

(52) U.S. Cl.
CPC ............. *H04N 23/55* (2023.01); *G02B 7/026* (2013.01); *G03B 30/00* (2021.01); *H04N 23/51* (2023.01)

(58) Field of Classification Search
CPC ........ H04N 23/55; H04N 23/51; G02B 7/026; G02B 7/028; G03B 30/00
See application file for complete search history.

(56) References Cited

U.S. PATENT DOCUMENTS

2012/0019905 A1* 1/2012 Teraoka ................. G02B 7/021 359/356
2019/0166289 A1* 5/2019 Knutsson ............... H04N 23/55

FOREIGN PATENT DOCUMENTS

JP 2019530887 A 10/2019

* cited by examiner

*Primary Examiner* — Ahmed A Berhan
(74) *Attorney, Agent, or Firm* — Canon U.S.A., Inc. IP Division

(57) ABSTRACT

An optical apparatus includes a lens, a lens holding member configured to hold the lens, an imaging device configured to receive light that has passed through the lens at an imaging plane of the imaging device to convert the received light into an electrical signal, and a device holder configured to hold the imaging device, the lens, the lens holding member, the imaging device, and the device holder being integrally formed in the optical apparatus, wherein the device holder holds a surface of the imaging device, the surface being different from the imaging plane and a surface opposite to the imaging plane, wherein the device holder includes, in order from the lens in an optical path direction, a first member containing a first material, and a second member containing a second material, and wherein a linear expansion coefficient of the first material is larger than that of the second material.

15 Claims, 9 Drawing Sheets

3
31a
32a
BACK
SIDE
31
35
31b
32

OPTICAL APPARATUS, VEHICLE-MOUNTED CAMERA, AND TRANSPORTATION APPARATUS

BACKGROUND

Field

The present disclosure relates to an optical apparatus, a vehicle-mounted camera, and a transportation apparatus.

Description of the Related Art

In these days, there are many vehicles (cars) each provided with a vehicle-mounted camera such as a sensing camera for achieving a drive assist function or an automatic driving function, and a camera for capturing images around the vehicle. The image captured by the vehicle-mounted camera is subjected to desired image processing to detect white lines and/or obstacles, and used for controlling the vehicle.

From the viewpoint of cost and compactness of apparatuses, many vehicle-mounted cameras do not have an autofocus function that is commonly used in digital still cameras, but have a fixed focal length configuration lens. Because the vehicle-mounted cameras are used in transportation apparatuses of which the environmental temperature is likely to change, the vehicle-mounted cameras are demanded to be stable in operation in a wide environmental temperature range, and to keep superior performances over the entire environmental temperature range.

The change in the environmental temperature leads to a change in dimensions of a housing or the like of the vehicle-mounted camera and a change of an optical system in focal length. For example, the length of the housing in an optical axis direction may sometimes increase due to the thermal expansion of the material caused by an increase in the environmental temperature. Thus, normally, the distance between an optical system mounted on the front side of the housing and an imaging device mounted on the back side of the housing increases as the environmental temperature rises. When the environmental temperature rises, normally, the focal length of the optical system becomes shorter due to the increase in lens intervals and/or the change of temperature characteristics in refractive index of the lens material.

It is necessary for the imaging device to be held near an in-focus position of the optical system to keep the fixed focal length type vehicle-mounted camera to have a superior performance through a wide range of the environmental temperature, in consideration of the change in focal length of the optical system and in dimensions of the housing or the like due to the change in the environmental temperature.

Japanese Unexamined Patent Application Publication (Translation of PCT Application) No. 2019-530887 discusses a technique of causing an image sensor to follow the thermal displacement of an image focal plane using a back plate that supports the image sensor and including two material elements designed to curve following the change in temperature.

SUMMARY

The present disclosure is directed to a compact optical apparatus in which an electrical connection portion between an imaging device and a device substrate on which the imaging device is mounted does not easily break, a vehicle-mounted camera, and a transportation apparatus.

According to an aspect of the present disclosure, an optical apparatus includes a lens, a lens holding member configured to hold the lens, an imaging device configured to receive light that has passed through the lens at an imaging plane of the imaging device to convert the received light into an electrical signal, and a device holder configured to hold the imaging device, the lens, the lens holding member, the imaging device, and the device holder being integrally formed in the optical apparatus, wherein the device holder holds a surface of the imaging device, the surface being different from the imaging plane of the imaging device and a surface opposite to the imaging plane, wherein the device holder includes, in order of proximity to the lens in an optical path direction along an optical axis of the lens, a first member containing a first material, and a second member containing a second material different from the first material, and wherein a linear expansion coefficient of the first material is larger than a linear expansion coefficient of the second material.

Further features of the present disclosure will become apparent from the following description of exemplary embodiments with reference to the attached drawings.

BRIEF DESCRIPTION OF THE DRAWINGS

FIGS. 6A, 6B, and 6C are diagrams illustrating a fixing method of fixing the lens barrel unit to a housing according to the exemplary embodiment of the present disclosure.

DESCRIPTION OF THE EMBODIMENTS

The camera module for cars discussed in Japanese Unexamined Patent Application Publication (Translation of PCT Application) No. 2019-530887 is configured to hold the back side of the image sensor with the back plate of the car. In general, in order to acquire an electrical signal from an image sensor, it is necessary to use an imaging device mounted on a device substrate as the image sensor, and in addition, to provide an electrical connection portion between the imaging device and the device substrate. Accordingly, a stress generated due to a curvature deformation of the back plate caused by a temperature change may act on the electrical connection portion between the imaging device and the device substrate. As a result, there is a possibility that the electrical connection portion may break.

With the configuration described above, the curvature deformation of the back plate is impeded by the stiffness of the image sensor. Thus, in order to obtain a sufficient deformation amount required for a position adjustment of the image sensor, the back plate itself needs to be large, and thus, there is a disadvantage that the apparatus becomes large in size.

With reference to the attached drawings, exemplary embodiments of the present disclosure will be described. The exemplary embodiments described below are merely examples, and the invention is not limited to the illustrated configurations and the like.

In the present specification, a temperature of an environment in which an object is present is referred to as an "environmental temperature". Examples of the environmental temperature include an atmospheric temperature, a room temperature, a temperature in a vehicle, and a water temperature.

The inventors investigated a configuration to reduce a distance between a focal position of an optical system and an imaging device position in a case where a fixed focal length type vehicle-mounted camera is placed in a high temperature environment. As a result, the inventors found that the distance between the focal position of the optical system and the imaging device position when the environmental temperature changed could be reduced, with the configuration of a device holder that holds the imaging device and includes a plurality of materials different in thermal characteristics. By further investigation, the inventors found that a configuration with which the stress generated due to the deformation of the device holder was less likely to act on the electrical connection portion for acquiring the electrical signal from the imaging device was able to be achieved, by holding side surfaces of the imaging device (i.e., surfaces different from the imaging plane and the opposite surface of the imaging plane) with the device holder.

Figure 1:
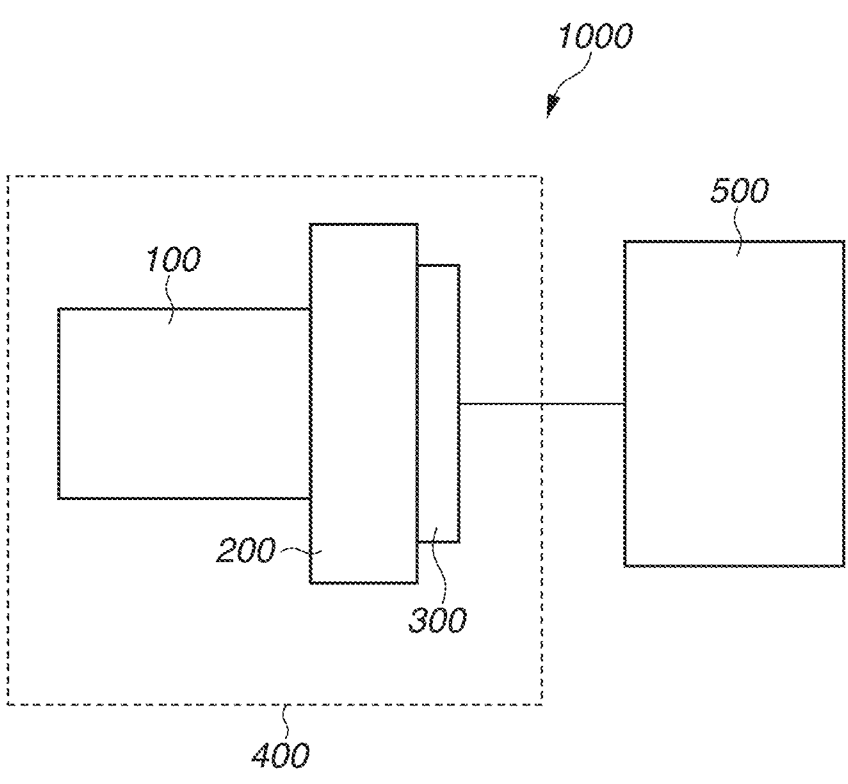
FIG. 1 is a schematic diagram illustrating a vehicle-mounted camera according to an exemplary embodiment of the present disclosure.

FIG. 1 is a diagram schematically illustrating a camera module 400 serving as an example of an optical apparatus according to an exemplary embodiment of the present disclosure. The camera module 400 is connected with an information processing unit 500 so that a vehicle-mounted camera 1000 is formed. The camera module 400 includes a lens barrel unit 100, a housing 200, and an imaging unit 300. The lens barrel unit 100 is held by the housing 200, and as described below, the imaging unit 300 is fixed to the housing 200 by bonding in a state where an optical adjustment is performed.

Figure 2:
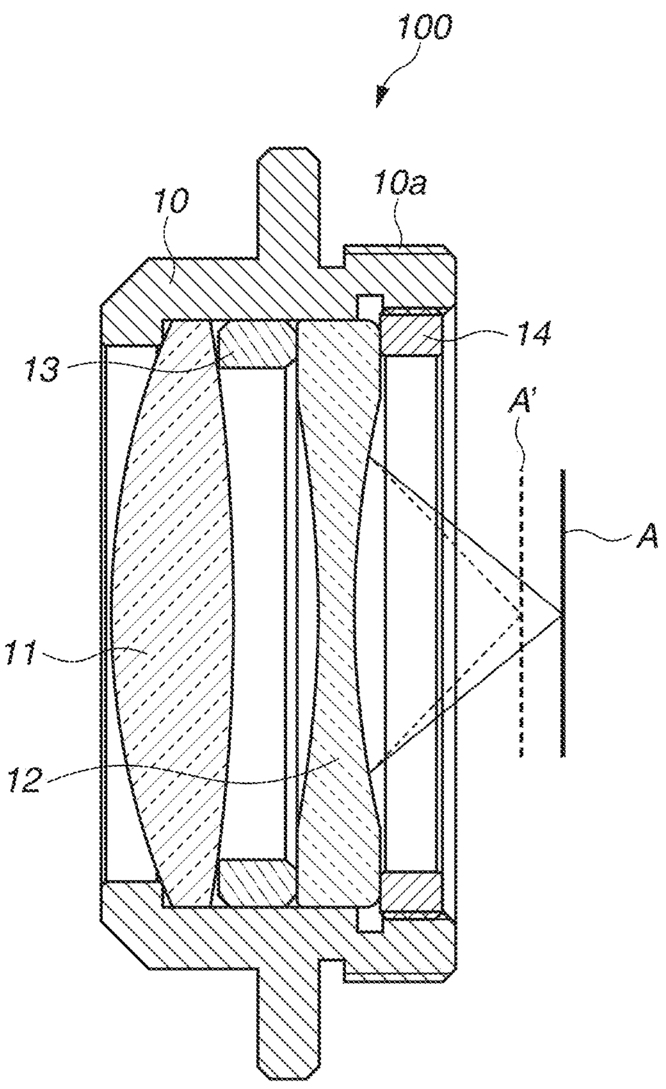
FIG. 2 is a cross-section diagram illustrating a lens barrel unit according to the exemplary embodiment of the present disclosure.

FIG. 2 is a cross-section diagram illustrating a cross-section of the lens barrel unit 100 in a central portion of the lens barrel unit 100, including an optical axis. The lens barrel unit 100 includes a lens barrel 10. The lens barrel unit 100 further includes a lens 11 and a lens 12 held inside the lens barrel 10 and arranged separately using a ring-shaped spacer 13, which is one of the lens holding members, and a pressing ring 14. The lens barrel 10 is made of a metal material or a resin material, and the lens 11 and the lens 12 are made of a light transmissive material such as a glass material or a resin material so that light can pass through the lenses.

The lens 11, the lens 12, and the spacer 13 are fixed by a male screw portion (not illustrated) provided on the external diameter portion of the pressing ring 14, which is one of the lens holding members, being screwed into a female screw portion (not illustrated) provided on the internal diameter portion of the lens barrel 10. The lens barrel 10 is provided with a male screw portion **10*a* for fixing the lens barrel unit 100 to the housing 200**, on its external diameter portion.

A plane A illustrated in FIG. 2 represents a focal position of the lens barrel unit 100 at an environmental temperature $T_1$, and a plane A' represents a focal position of the lens barrel unit 100 at an environmental temperature $T_2$. $T_1$ is a temperature lower than $T_2(T_1<T_2)$. A change in the environmental temperature results in a change of the spacer 13 in thickness dimension, and in changes of the lens 11 and the lens 12 in shape and refractive index (due to temperature characteristics), which changes the focal position. In general, an increase in environmental temperature causes the focal length to be shorter, as illustrated in FIG. 2.

Figures 3A, 3B:
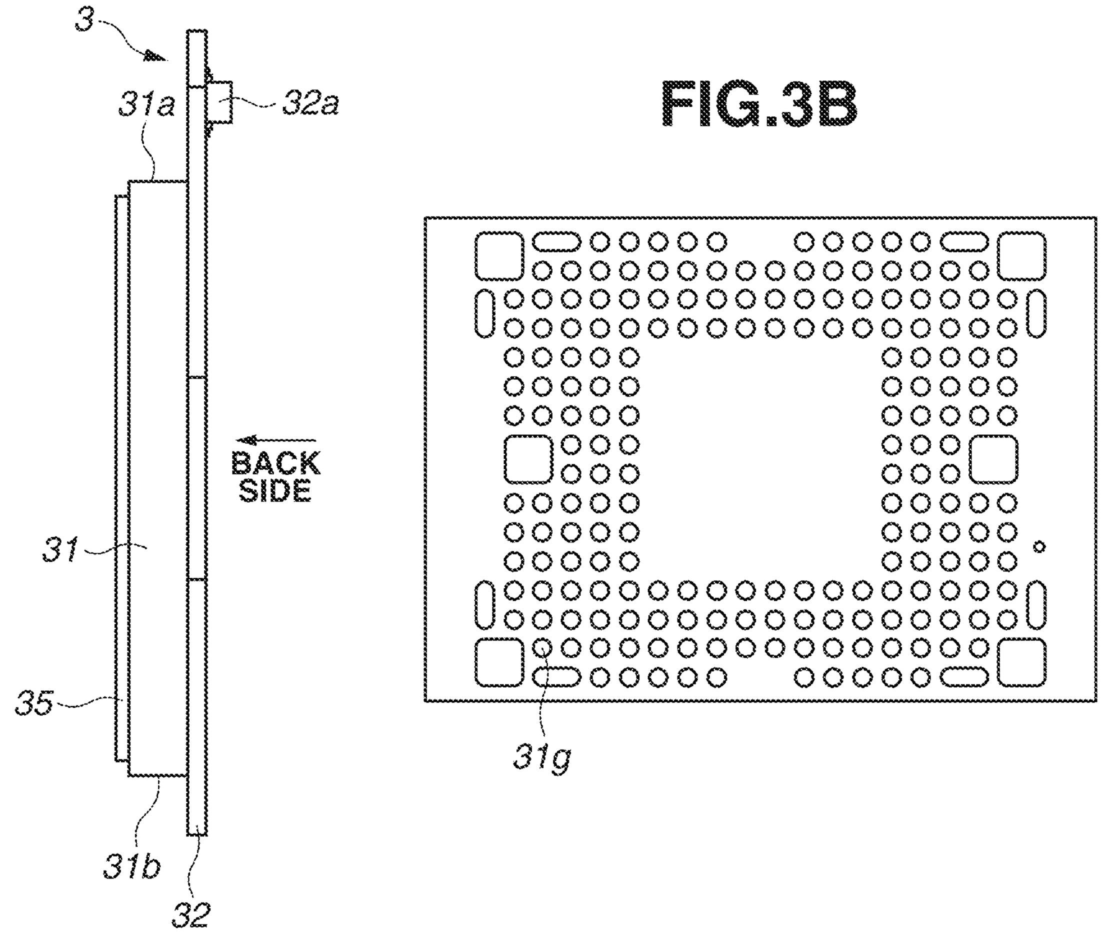
FIGS. 3A and 3B are diagrams illustrating a configuration of an imaging device unit.

With reference to FIGS. 3A and 3B, the imaging device unit 3 will be described. FIG. 3A is a side view of the imaging device unit 3, and FIG. 3B is a back view of an imaging device 31.

The imaging device unit 3 includes the imaging device 31 including a photoelectric conversion unit therein, and the imaging device 31 is mounted on a device substrate 32, as illustrated in FIG. 3A. An object image is formed on the imaging plane with light received by the imaging device 31 through the lenses 11 and 12 of the lens barrel unit 100, and the formed object image is photoelectrically converted into an electrical signal by the photoelectric conversion unit. In the present exemplary embodiment, a complementary metal-oxide semiconductor (CMOS) sensor is used as the imaging device 31, but the imaging device is not limited to the CMOS sensor, and other types of imaging devices, such as a charge-coupled device (CCD) type image sensor and a charge injection device (CID) type image sensor, may be used. The front side (side on which light enters) of the imaging device 31 is covered by a cover glass 35. An electrode pad **31*g*, which is a part of the electrical connection portion, is provided on the back side (side opposite to the side on which light enters) of the imaging device 31, and the electrode pad 31*g* is electrically connected with the photoelectric conversion unit of the imaging device 31**.

The device substrate 32 is electrically connected with the photoelectric conversion unit of the imaging device 31 via the electrode pad **31*g*, to receive an electrical signal from the imaging device 31. A substrate connector 32*a*, which is a part of the electrical connection portion electrically connected with the control circuit (not illustrated) of the information processing unit 500, is arranged on the back side of the device substrate 32**.

The electrode pad **31*g* of the imaging device 31 is electrically connected to the device substrate 32 by being soldered onto a land portion (not illustrated) of the device substrate 32 using an automated assembly process. In this way, the imaging device 31 and the device substrate 32 are integrated. The device substrate 32 may be a flexible substrate such as a flexible printed circuit (FPC) board. The cover glass 35 is bonded and fixed to the imaging device 31 in a state where the cover glass 35 overlaps the surface of the imaging device 31, to prevent foreign substances from adhering to the imaging device 31**.

The electrical signal output from the photoelectric conversion unit of the imaging device 31 is transmitted to the device substrate 32 via the electrode pad **31*g*, and transmitted to the control circuit (not illustrated) of the information processing unit 500 from the device substrate 32 via the substrate connector 32*a***. Then, desired image processing is performed.

Figures 4A, 4B, 4C:
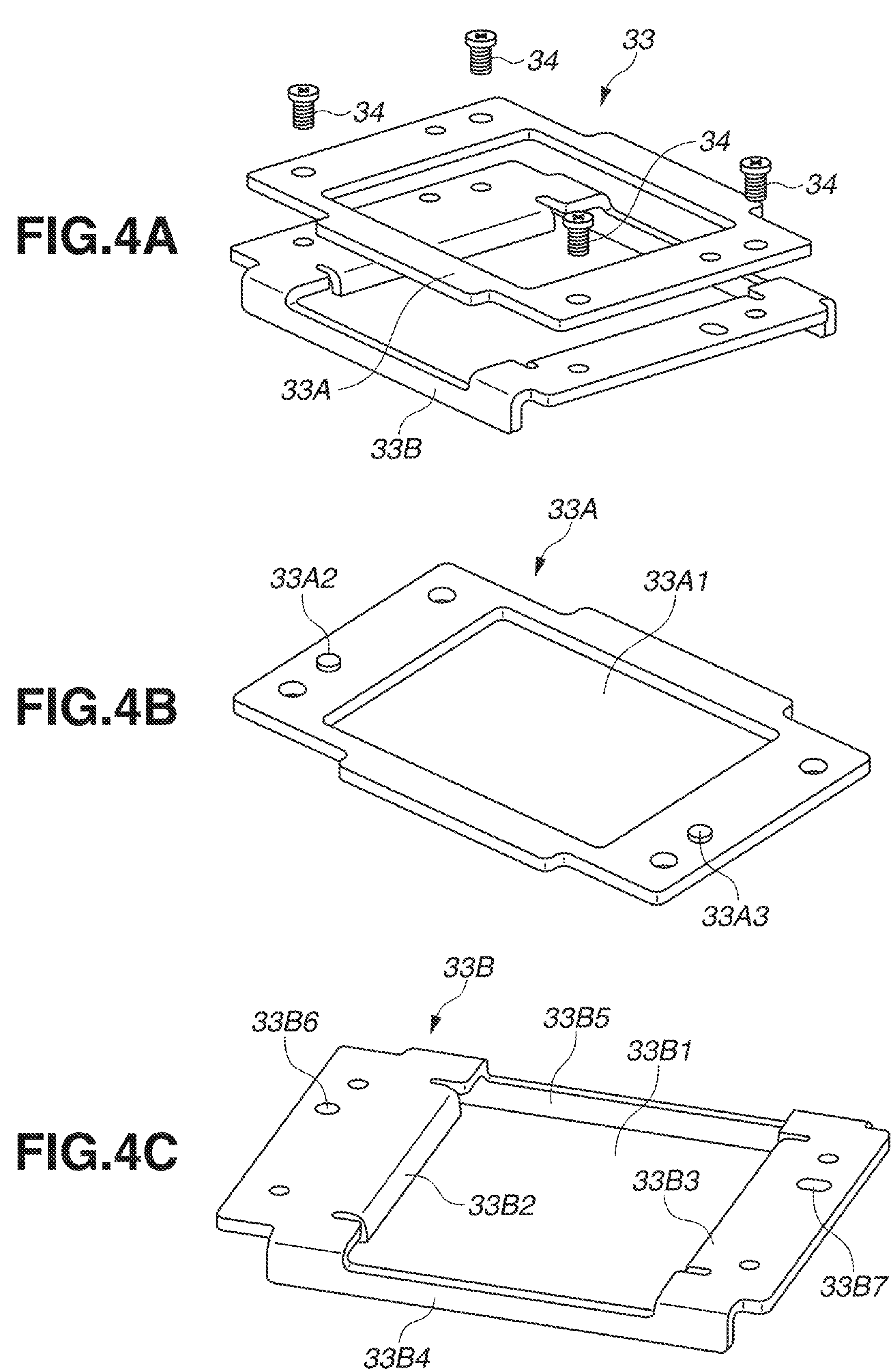
FIGS. 4A, 4B, and 4C are diagrams illustrating a configuration of a device holder according to the exemplary embodiment of the present disclosure.

With reference to FIGS. 4A, 4B, and 4C, a device holder 33 to which the imaging device unit 3 is positioned and fixed will be described. FIG. 4A is an exploded perspective view of the device holder 33, FIG. 4B is a perspective view of a device holder member 33A, and FIG. 4C is a perspective view of a device holder member 33B.

As illustrated in FIG. 4A, the device holder 33 includes the device holder member 33A that is a first member containing a first material, and the device holder member 33B that is a second member containing a second material different from the first material. These members are arranged in order of the device holder member 33A and the device holder member 33B seen from the front side of the camera module 400, i.e., in order of proximity to the lenses 11 and 12 in an optical path direction along an optical axis of the lenses 11 and 12.

As the first material, at least a material selected from a group consisting of stainless steel, aluminum alloy, copper alloy, polycarbonate resin (PC resin), and polyphenylene sulfide resin (PPS resin) can be used. The polycarbonate resin and the polyphenylene sulfide resin containing fiber glass may be used to increase the strength. The first material may desirably be a main component of the first member to sufficiently deform the first member (i.e., device holder member 33A). The main component indicates a material that accounts for 50 wt % or more of the first member.

As the second material, at least a material selected from a group consisting of carbon steel, stainless steel, copper alloy, and aluminum alloy can be used. The second material may desirably be a main component of the second member to sufficiently deform the second member (i.e., device holder member 33B). The main component indicates a material that accounts for 50 wt % or more of the second member.

As described below, the imaging device unit 3 moves in the optical axis direction due to the deformation of the device holder 33 caused by the change of the environmental temperature, to keep the imaging device unit 3 within a range in which the performance of the vehicle-mounted camera 1000 is secured in a wide range of the environmental temperature. Normally, since the focal length of the optical system changes to be shorter as the environmental temperature rises, the imaging device unit 3 needs to be moved closer to the lens barrel unit 100.

A linear expansion coefficient $\alpha_a$ of the first material may desirably be larger than a linear expansion coefficient $\alpha_b$ of the second material, to achieve the movement of the imaging device unit 3 in the above-described direction, and the compactness of the apparatus. Further, the difference between the linear expansion coefficient $\alpha_a$ of the first material and the linear expansion coefficient $\alpha_b$ of the second material may desirably be $3.5\times10^{-6}$/° C. or more, in order to increase the movement amount of the imaging device unit 3.

The linear expansion coefficient α is defined as an extension rate per unit temperature change. The linear expansion coefficient α(/° C.) is $(\Delta L/L_0)\{1/(T_1-T_0)\}$, in a case where an extension amount is defined as ΔL when a solid sample with a length $L_0$ at the temperature $T_0$° C. is heated to $T_1$° C.

To reduce the variation of the deformation amount due to the variations of the shapes and the physical properties of individual parts, the linear expansion coefficient da of the first material may desirably be $14.0\times10^{-6}$/° C. or more and $24.0\times10^{-6}$/° C. or less. From the similar point of view, the linear expansion coefficient ab of the second material may desirably be $9.9\times10^{-6}$/° C. or more and $20.5\times10^{-6}$/° C. or less.

The device holder member 33A is provided with an opening 33A1 for exposing the imaging plane of the imaging device 31, and projection portions 33A2 and 33A3 for positioning the device holder member 33A to the device holder member 33B. The surface of the device holder member 33A may desirably be subjected to anti-reflection processing by electroplating or coating. In other words, it is desirable that the surface of the device holder member 33A is covered with a material different from the first material that is a main component of the device holder member 33A. The main component indicates a material that accounts for 50 wt % or more of the member.

The device holder member 33B is provided with an opening 33B1 for exposing the imaging plane of the imaging device 31. Projection portions 33B2 and 33B3 projecting toward the back side of the device holder member 33B are formed on the device holder member 33B on two sides of the opening 33B1, and projection portions 33B4 and 33B5 projecting toward the back side are formed on a part of the fringe portion of the device holder member 33B. A pair of a positioning hole 33B6 and a sway stopping hole 33B7 is formed in the device holder member 33B. In the present exemplary embodiment, the projection portions 33B4 and 33B5 both project toward the back side, but both of the projection portions 33B4 and 33B5 do not need to project toward the back side, and the projection portions 33B4 and 33B5 may both project toward the front side, or respectively project to different directions.

The device holder member 33A is positioned by fitting the projection portions 33A2 and 33A3 into the pair of the positioning hole 33B6 and the sway stopping hole 33B7 provided in the device holder member 33B, and joined with the device holder member 33B by fastening the device holder member 33A at four positions with screws 34.

In the present exemplary embodiment, the device holder member 33A and the device holder member 33B are joined by fastening the device holder member 33A at the four positions with the screws 34, but the invention is not limited to this example. The device holder member 33A and the device holder member 33B may be joined at least two positions to be integrated. The method of joining the device holder member 33A and the device holder member 33B is not limited to the method of fastening with the screws.

The joining method may be at least a method selected from a group consisting of screw fastening, caulking, welding, depositing, and bonding. Further, in the present exemplary embodiment, the connection portions (projection portions 33B2 and 33B3) with the imaging device unit 3, and the connection portions (projection portions 33B4 and 33B5) with the housing 200 are provided on the device holder member 33B, but the above-described plurality of connection portions may be provided on the device holder member 33A.

Figure 5B:
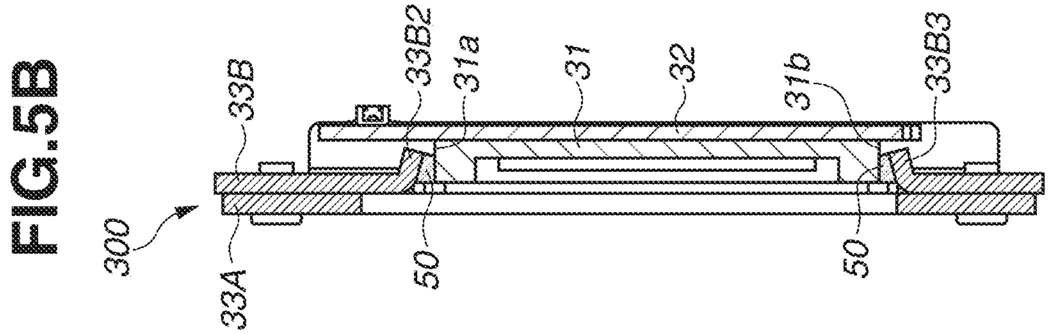
FIGS. 5A and 5B are diagrams illustrating a fixing method of fixing the imaging device unit to the device holder according to the exemplary embodiment of the present disclosure.
Figure 5A:
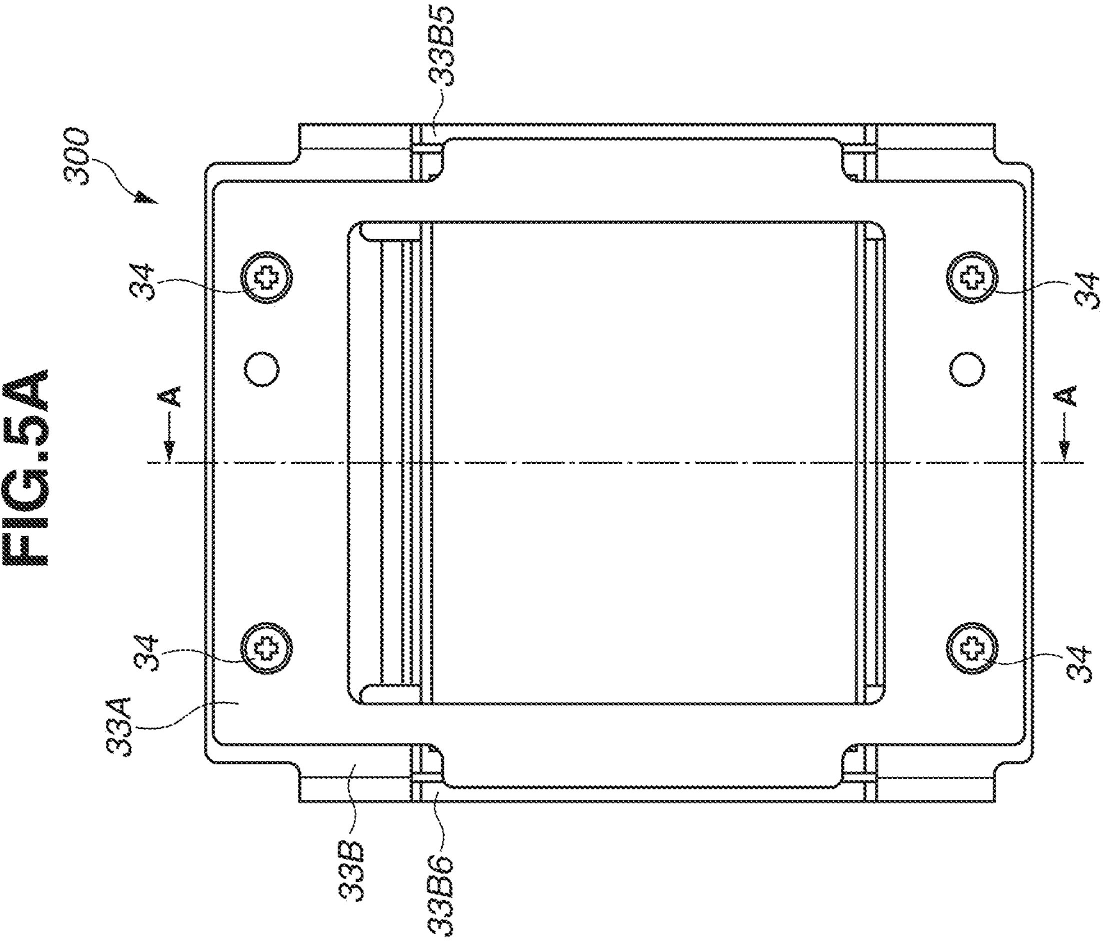

With reference to FIGS. 5A and 5B, a fixing method of fixing the imaging device unit 3 to the device holder 33 will be described. FIG. 5A is a front view illustrating a state where the imaging device unit 3 is fixed to the device holder 33, and FIG. 5B is an A-A cross-section diagram of FIG. 5A.

The imaging device unit 3 is assembled to the device holder 33 from the back side thereof so that the imaging device 31 enters into the opening 33B1 of the device holder member 33B. When the imaging device unit 3 is assembled to the device holder 33, the device holder 33 is fixed, and the position of the imaging device unit 3 is adjusted, using a position adjustment jig, so that the center of the photoelectric conversion unit in the imaging device 31 coincides with the approximate center of the opening 33B1 provided in the device holder member 33B.

After the position adjustment is completed, the adhesive 50 is injected to fill respective spaces formed between side surfaces 31*a* and 31*b* of the imaging device 31, and the projection portions 33B2 and 33B3 each inclining by a predetermined amount toward the back side in the optical axis direction, and is hardened.

With the adhesive 50, the imaging device unit 3 is fixed to the device holder 33. Since the imaging device unit 3 is assembled to the device holder 33 from the back side of the device holder 33, and the side surfaces 31*a* and 31*b* of the imaging device 31 are held by bonding, the device holder member 33B has a shape not to overlap the imaging device 31 in the optical axis direction.

Because the deformation amount of the device holder 33 changes depending on the thicknesses of the device holder members 33A and 33B, the device holder 33 enabling the desired deformation amount can be designed by changing the thicknesses of the device holder members 33A and 33B.

With the configuration of bonding the projection portions 33B2 and 33B3 with the imaging device unit 3, regardless of the thickness of the device holder member 33B, it is possible to secure the bonding area between the device holder member 33B and the imaging device unit 3. In this way, an impact resistance property of the imaging unit 300 can be secured. Further, when the adhesive 50 is hardened, the projection portions 33B2 and 33B3 of the device holder member 33B deform to reduce the stress acting on the imaging device 31, which can reduce the deformation of the imaging device 31.

It is desirable that the projection portions 33B2 and 33B3 have a shape inclining by a predetermined amount with respect to the optical axis toward the back side. With this configuration, the respective spaces between the side surfaces 31*a* and 31*b* of the imaging device 31 and the projection portions 33B2 and 33B3 are formed so as to become narrower toward the back side. With this shape, the adhesive 50 is prevented from flowing out toward the device substrate 32 of the imaging device unit 3. The adhesive 50 desirably has a high heat resistance, and specifically, a glass transition temperature (Tg) of 85° C. or more.

In the present exemplary embodiment, the imaging device unit 3 is fixed to the device holder 33 after the device holder member 33A and the device holder member 33B are integrated, but the invention is not limited to this example. For example, the device holder member 33A may be fixed to the device holder member 33B, after the imaging device unit 3 is positioned and fixed to the device holder member 33B.

Figures 6A, 6B, 6C:
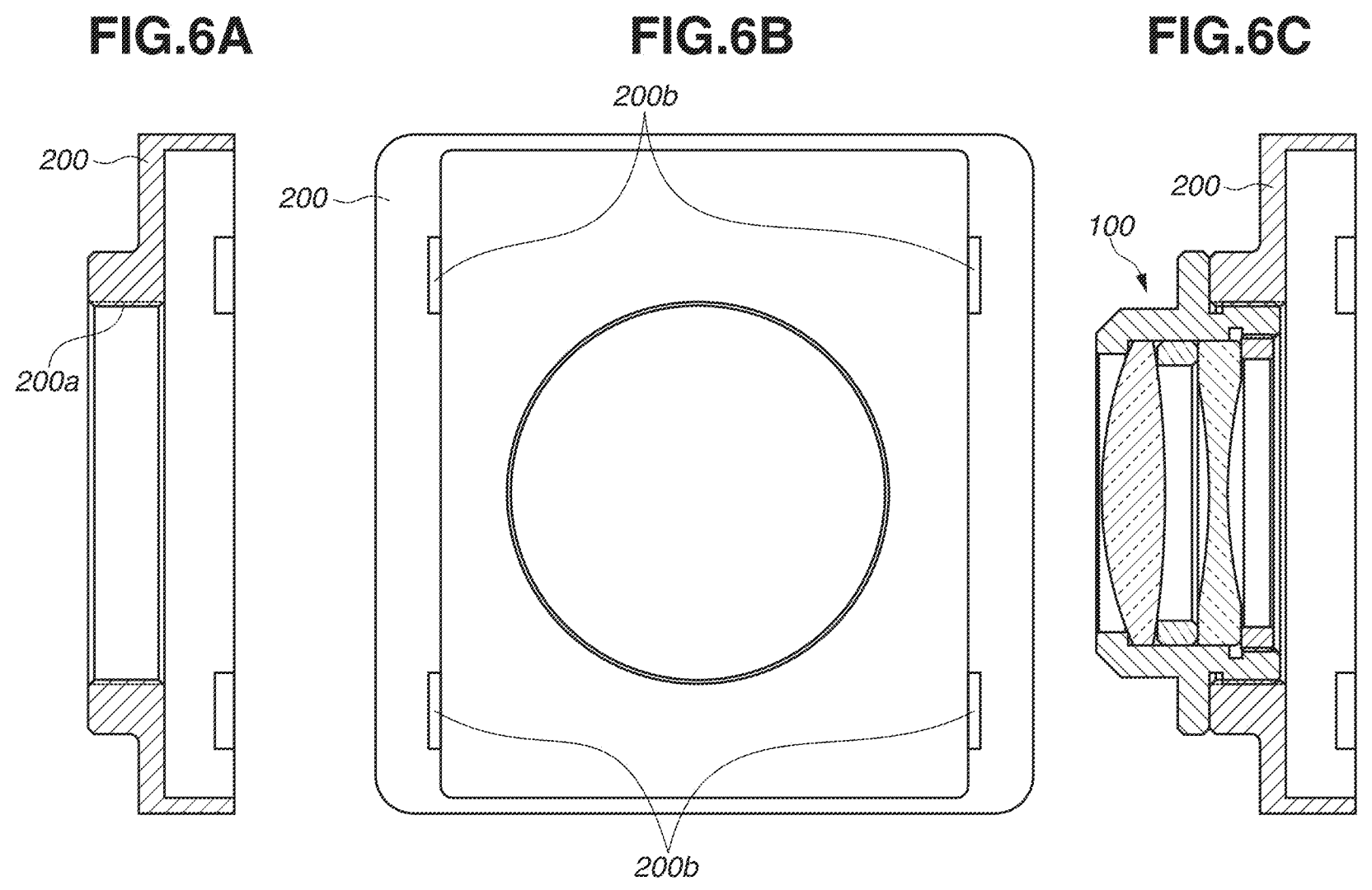

With reference to FIGS. 6A, 6B, and 6C, a mounting method of mounting the lens barrel unit 100 on the housing 200 will be described. FIG. 6A is a cross-section diagram of the housing 200, FIG. 6B is a back view of the housing 200, and FIG. 6C is a cross-section diagram illustrating a state where the lens barrel unit 100 is fixed to the housing 200.

The housing 200 is provided with a female screw portion 200*a* therein for attaching the lens barrel unit 100, and on the back side, the housing 200 is provided with adhesion grooves 200*b* for fixing the imaging unit 300 at four positions of the housing 200. The lens barrel unit 100 is fixed to the housing 200 by screwing the male screw portion 10*a* provided on the lens barrel unit 100 into the female screw portion 200*a* provided in the housing 200.

Figure 7:
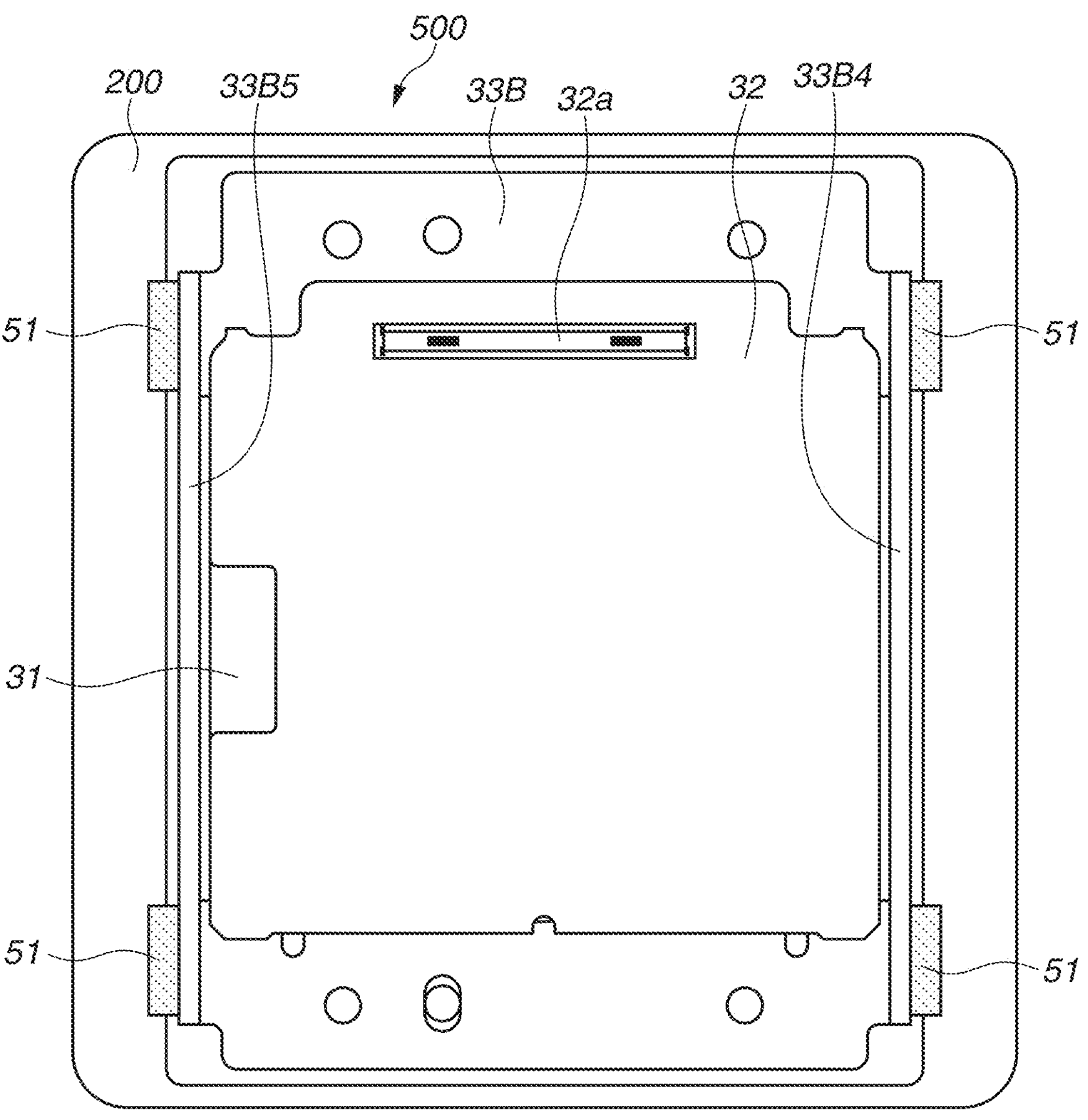
FIG. 7 is a diagram illustrating a positioning and fixing method of positioning and fixing the imaging unit to the housing according to the exemplary embodiment of the present disclosure.

With reference to FIG. 7, a fixing method of fixing the imaging unit 300 to the housing 200 will be described. FIG. 7 illustrates a state where the imaging unit 300 is fixed by bonding the imaging unit 300 to the housing 200 with adhesive 51, after the imaging unit 300 is assembled in the housing 200.

The imaging unit 300 is adjusted so that the imaging plane of the imaging device 31 is positioned within a tolerance range that can secure a desired performance of the vehicle-mounted camera 1000, with the focal position of the lens barrel unit 100 assembled in the housing 200 being as a center. After the adjustment is completed, the imaging unit 300 is fixed to the housing 200 by injecting the adhesive 51 to fill the respective spaces formed between the projection portions 33B5 and 33B4 provided on the device holder member 33B and the adhesion grooves 200*b* provided in the housing 200, and hardening the adhesive 51. The adhesive 51 may desirably have a high heat resistance property, and specifically, a glass transition temperature (Tg) of 85° C. or more.

Figure 8A:
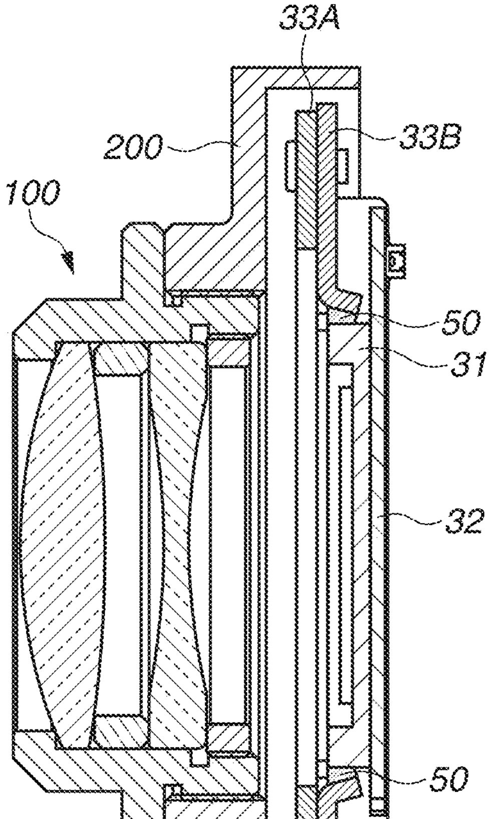
FIGS. 8A and 8B are diagrams illustrating a deformation of the device holder and a position of the imaging device unit due to a change in environmental temperature, according to the exemplary embodiment of the present disclosure.
Figure 8B:
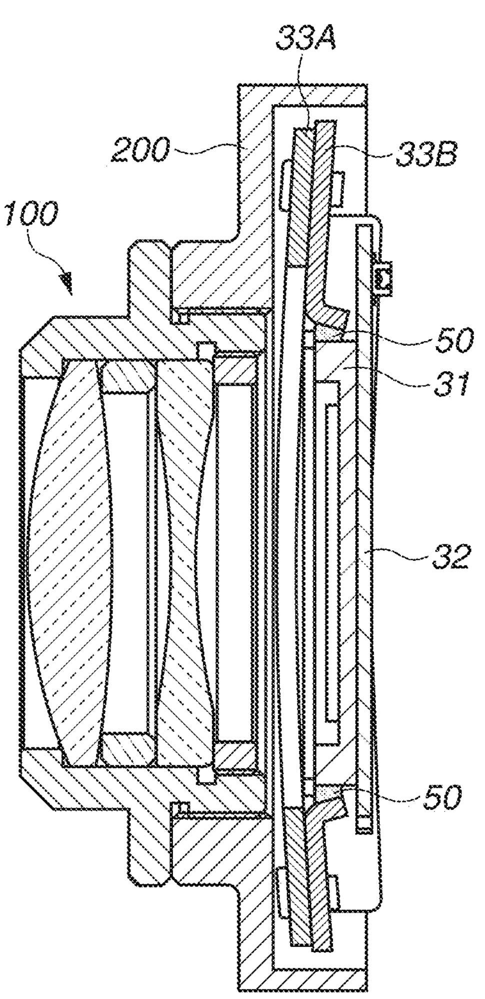

With reference to FIGS. 8A and 8B, the deformation state of the device holder 33, and the movement of the imaging device unit 3 in the optical axis direction, when the environmental temperature changes, will be described. FIG. 8A is a cross-section diagram illustrating the camera module 400 at the environmental temperature $T_1$, and FIG. 8B is a cross-section diagram illustrating the camera module 400 at the environmental temperature $T_2 (T_1 < T_2)$.

When the environmental temperature rises from $T_1$ to $T_2$, the device holder 33, which is integrally formed of the device holder member 33A and the device holder member 33B respectively having different linear expansion coefficients, warps. As described above, since the relationship between the linear expansion coefficient $\alpha_a$ of the first material and the linear expansion coefficient $\alpha_b$ of the second material is $\alpha_a > \alpha_b$, the device holder 33 deforms so that the device holder 33 projects toward the lens barrel unit 100. More specifically, when the environmental temperature rises, the device holder 33 deforms so that the imaging device approaches the lenses 11 and 12.

Since the imaging device unit 3 is fixed to the device holder 33 via the adhesive 50, the imaging device unit 3 moves in the optical axis direction and approaches the lens barrel unit 100, as the device holder 33 deforms. The deformation amount of the device holder 33 when the environmental temperature changes can be changed based on the difference between the $\alpha_a$ and the $\alpha_b$, sizes and thicknesses of the device holder member 33A and the device holder member 33B, fastening positions, and the elastic coefficients.

Thus, by appropriately designing the deformation amount of the device holder 33 in consideration of the changes of the focal length and the dimensions of the housing 200 due to the environmental temperature change, it is possible to hold the imaging plane of the imaging device 31 within the above-described tolerance range. Further, it is possible for the vehicle-mounted camera 1000 to keep an excellent performance in a wide range of the environmental temperature.

Since the imaging device 31 is held by the device holder 33 at the side surfaces 31*a* and 31*b*, the stress generated due to the deformation of the device holder 33 caused by the environmental temperature change is not likely to act on the electrical connection portion between the imaging device 31 and the device substrate 32, and thus it is possible to prevent the breakage of the electrical connection portion. Further, since the imaging device 31 is held by the device holder 33 at the side surfaces 31*a* and 31*b*, it is possible to minimize the influence of the stiffness of the imaging device 31 on the deformation of the device holder 33. As a result, it is possible to achieve the compactness of the device holder 33, i.e., the compactness of the camera module 400.

Figure 9:
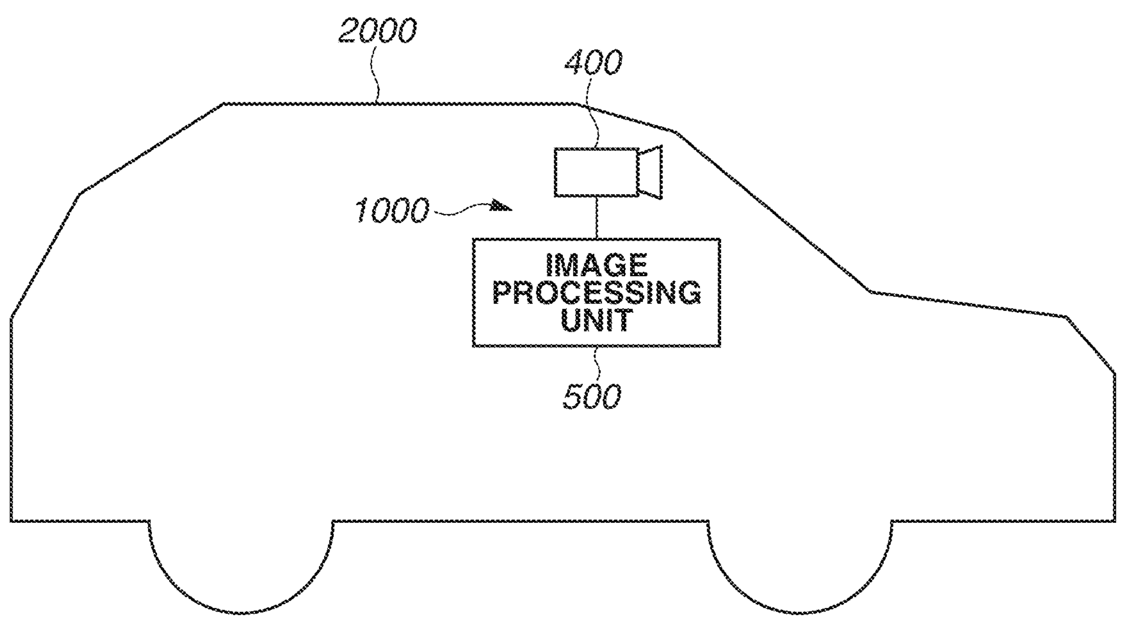
FIG. 9 is a diagram illustrating a configuration of a transportation apparatus (vehicle) according to the exemplary embodiment of the present disclosure.

The exemplary embodiments of the invention are not limited to the above-described exemplary embodiments, and the exemplary embodiments may be applied to a transportation apparatus including the camera module 400 and the information processing unit 500. FIG. 9 is a diagram schematically illustrating a configuration of a transportation apparatus (vehicle) according to an exemplary embodiment of the present disclosure. Examples of the transportation apparatus include a car, a ship, and an aircraft. The transportation apparatus according to the present exemplary embodiment of the present disclosure can capture high-precision images by including a device holder that deforms as the environmental temperature changes, under an environment at a high environmental temperature.

The present disclosure includes following configurations.

Configuration 1

An optical apparatus comprising a lens, a lens holding member configured to hold the lens, an imaging device configured to receive light that has passed through the lens at an imaging plane of the imaging device to convert the received light into an electrical signal, and a device holder configured to hold the imaging device, the lens, the lens holding member, the imaging device, and the device holder being integrally formed in the optical apparatus, wherein the device holder holds a surface of the imaging device, the surface being different from the imaging plane of the imaging device and a surface opposite to the imaging plane, wherein the device holder includes, in order of proximity to the lens in an optical path direction along an optical axis of the lens, a first member containing a first material, and a second member containing a second material different from the first material, and wherein a linear expansion coefficient of the first material is larger than a linear expansion coefficient of the second material.

Configuration 2

The optical apparatus according to Configuration 1, wherein a difference between the linear expansion coefficient of the first material and the linear expansion coefficient of the second material is $3.5\times10^{-6}$/° C. or more.

Configuration 3

The optical apparatus according to Configuration 1 or 2, wherein the linear expansion coefficient of the first material is $14.0\times10^{-6}$/° C. or more and $24.0\times10^{-6}$/° C. or less.

Configuration 4

The optical apparatus according to any one of Configurations 1 to 3, wherein the linear expansion coefficient of the second material is $9.9\times10^{-6}$/° C. or more and $20.5\times10^{-6}$/° C. or less.

Configuration 5

The optical apparatus according to any one of Configurations 1 to 4, wherein the first material is at least a material selected from a group consisting of stainless steel, copper alloy, aluminum alloy, polycarbonate resin, and polyphenylene sulfide resin.

Configuration 6

The optical apparatus according to any one of Configurations 1 to 5, wherein the second material is at least a material selected from a group consisting of carbon steel, stainless steel, copper alloy, and aluminum alloy.

Configuration 7

The optical apparatus according to any one of Configurations 1 to 6, wherein the first member and the second member are joined at least at two positions.

Configuration 8

The optical apparatus according to any one of Configurations 1 to 7, wherein the first member and the second member are joined by at least a method selected from a group consisting of screw fastening, caulking, welding, depositing, and bonding.

Configuration 9

The optical apparatus according to any one of Configurations 1 to 8, wherein the device holder holds the imaging device via a resin material having a glass transition temperature of 85° C. or more.

Configuration 10

The optical apparatus according to any one of Configurations 1 to 9, further comprising a housing configured to hold the lens holding member and the device holder.

Configuration 11

The optical apparatus according to any one of Configuration 10, wherein the housing holds the device holder via a resin material having a glass transition temperature of 85° C. or more.

Configuration 12

The optical apparatus according to any one of Configurations 1 to 11, wherein the first member is covered with a material different from the first material.

Configuration 13

The optical apparatus according to any one of Configurations 1 to 12, wherein at least one of the first member and the second member does not overlap the imaging device in the optical path direction.

Configuration 14

The optical apparatus according to any one of Configurations 1 to 13, wherein any one of the first member and the second member is provided with two projection portions projecting toward an opposite side of the imaging plane of the imaging device.

Configuration 15

The optical apparatus according to any one of Configurations 1 to 14, wherein the device holder deforms as an environmental temperature changes.

Configuration 16

The optical apparatus according to Configuration 15, wherein the device holder deforms so that the imaging device approaches the lens when the environmental temperature rises.

Configuration 17

A vehicle-mounted camera comprising the optical apparatus according to any one of Configurations 1 to 16, and an information processing unit configured to process the electrical signal.

Configuration 18

A transportation apparatus comprising the optical apparatus according to any one of Configurations 1 to 16, and an information processing unit configured to process the electrical signal.

According to the present disclosure, it is possible to provide a compact optical apparatus in which an electrical connection portion between an imaging device and a substrate on which an imaging device is mounted, a vehicle-mounted camera, and a transportation apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-145935, filed Sep. 8, 2023, and No. 2024-128717, filed Aug. 5, 2024, which are hereby incorporated by reference herein in their entirety.

What is claimed is:

1. An optical apparatus comprising:

a lens;

a lens holding member configured to hold the lens;

an imaging device configured to receive light that has passed through the lens at an imaging plane of the imaging device to convert the received light into an electrical signal; and a device holder configured to hold the imaging device, the lens, the lens holding member, the imaging device, and the device holder being integrally formed in the optical apparatus, wherein the device holder holds a surface of the imaging device, the surface being different from the imaging plane of the imaging device and a surface opposite to the imaging plane, wherein the device holder includes, in order of proximity to the lens in an optical path direction along an optical axis of the lens, a first member containing a first material, and a second member containing a second material different from the first material, wherein a linear expansion coefficient of the first material is larger than a linear expansion coefficient of the second material, wherein the linear expansion coefficient of the first material is $14.0\times10^{-6}/°$ C. to $24.0\times10^{-6}/°$ C., wherein the linear expansion coefficient of the second material is $9.9\times10^{-6}/°$ C. to $20.5\times10^{-6}/°$ C., and wherein a difference between the linear expansion coefficient of the first material and the linear expansion coefficient of the second material is $3.5\times10^{-6}/°$ C. or more.

2. The optical apparatus according to claim 1, wherein the first material is at least a material selected from a group consisting of stainless steel, copper alloy, aluminum alloy, polycarbonate resin, and polyphenylene sulfide resin.

3. The optical apparatus according to claim 1, wherein the second material is at least a material selected from a group consisting of carbon steel, stainless steel, copper alloy, and aluminum alloy.

4. The optical apparatus according to claim 1, wherein the first member and the second member are joined at least at two positions.

5. The optical apparatus according to claim 1, wherein the first member and the second member are joined by at least a method selected from a group consisting of screw fastening, caulking, welding, depositing, and bonding.

6. The optical apparatus according to claim 1, wherein the device holder holds the imaging device via a resin material.

7. The optical apparatus according to claim 1, further comprising a housing configured to hold the lens holding member and the device holder.

8. The optical apparatus according to claim 7, wherein the housing holds the device holder via a resin material.

9. The optical apparatus according to claim 1, wherein the first member is covered with a material different from the first material.

10. The optical apparatus according to claim 1, wherein at least one of the first member and the second member does not overlap the imaging device in the optical path direction.

11. The optical apparatus according to claim 1, wherein any one of the first member and the second member is provided with two projection portions projecting toward the opposite side of the imaging plane of the imaging device.

12. The optical apparatus according to claim 1, wherein the device holder deforms as an environmental temperature changes.

13. The optical apparatus according to claim 12, wherein the device holder deforms so that the imaging device approaches the lens when the environmental temperature rises.

14. A vehicle-mounted camera comprising:

a lens;

a lens holding member configured to hold the lens;

an imaging device configured to receive light that has passed through the lens at an imaging plane of the imaging device to convert the received light into an electrical signal;

a device holder configured to hold the imaging device, and an information processing unit configured to process the electrical signal, the lens, the lens holding member, the imaging device, and the device holder being integrally formed in an optical apparatus, wherein the device holder holds a surface of the imaging device, the surface being different from the imaging plane of the imaging device and a surface opposite to the imaging plane, wherein the device holder includes, in order of proximity to the lens in an optical path direction along an optical axis of the lens, a first member containing a first material, and a second member containing a second material different from the first material, wherein a linear expansion coefficient of the first material is larger than a linear expansion coefficient of the second material, wherein the linear expansion coefficient of the first material is $14.0\times10^{-6}/°$ C. to $24.0\times10^{-6}/°$ C., wherein the linear expansion coefficient of the second material is $9.9\times10^{-6}/^\circ$ C. to $20.5\times10^{-6}/^\circ$ C., and wherein a difference between the linear expansion coefficient of the first material and the linear expansion coefficient of the second material is $3.5\times10^{-6}/^\circ$ C. or more.

15. A transportation apparatus comprising:

a lens;

a lens holding member configured to hold the lens;

an imaging device configured to receive light that has passed through the lens at an imaging plane of the imaging device to convert the received light into an electrical signal;

a device holder configured to hold the imaging device, and an information processing unit configured to process the electrical signal, the lens, the lens holding member, the imaging device, and the device holder being integrally formed in and optical apparatus, wherein the device holder holds a surface of the imaging device, the surface being different from the imaging plane of the imaging device and a surface opposite to the imaging plane, wherein the device holder includes, in order of proximity to the lens in an optical path direction along an optical axis of the lens, a first member containing a first material, and a second member containing a second material different from the first material, wherein a linear expansion coefficient of the first material is larger than a linear expansion coefficient of the second material, wherein the linear expansion coefficient of the first material is $14.0\times10^{-6}/^\circ$ C. to $24.0\times10^{-6}/^\circ$ C., wherein the linear expansion coefficient of the second material is $9.9\times10^{-6}/^\circ$ C. to $20.5\times10^{-6}/^\circ$ C., and wherein a difference between the linear expansion coefficient of the first material and the linear expansion coefficient of the second material is $3.5\times10^{-6}/^\circ$ C. or more.

* * * * *